(12) United States Patent
Lund et al.

(10) Patent No.: US 12,471,754 B2
(45) Date of Patent: Nov. 18, 2025

(54) ENDOSCOPE AND A METHOD FOR ASSEMBLING AN ENDOSCOPE

(71) Applicant: AMBU A/S, Ballerup (DK)

(72) Inventors: Jesper Grøndahl Lund, Værløse (DK); Bjørn Bruhn Thomsen, Birkerød (DK)

(73) Assignee: AMBU A/S, Ballerup (DK)

( * ) Notice: Subject to any disclaimer, the term of this patent is extended or adjusted under 35 U.S.C. 154(b) by 572 days.

(21) Appl. No.: 17/920,329

(22) PCT Filed: Apr. 21, 2021

(86) PCT No.: PCT/DK2021/050116
§ 371 (c)(1),
(2) Date: Oct. 20, 2022

(87) PCT Pub. No.: WO2021/213599
PCT Pub. Date: Oct. 28, 2021

(65) Prior Publication Data
US 2023/0165436 A1    Jun. 1, 2023

(30) Foreign Application Priority Data

Apr. 24, 2020 (DK) .......................... PA 2020 70257

(51) Int. Cl.
*A61B 1/00* (2006.01)
*A61B 1/005* (2006.01)
*A61B 1/05* (2006.01)

(52) U.S. Cl.
CPC ...... *A61B 1/00066* (2013.01); *A61B 1/00128* (2013.01); *A61B 1/0052* (2013.01); *A61B 1/05* (2013.01)

(58) Field of Classification Search
CPC ............ A61B 1/00112; A61B 1/00121; A61B 1/00066; A61B 1/0052; A61B 1/00128; A61B 1/00105; A61B 1/0011; A61B 1/05
(Continued)

(56) References Cited

U.S. PATENT DOCUMENTS 4,750,477 A    6/1988  Wardle
7,833,153 B2 * 11/2010 Takeuchi ........... A61B 1/00183
                                                      600/137
(Continued)

FOREIGN PATENT DOCUMENTS

CA       3078145 A1     4/2019
DE    202011005365 U1   10/2011
(Continued)

OTHER PUBLICATIONS

Examination report in Danish Patent Application No. PA 2020 70257 dated Jul. 31, 2020, 6 pages.
(Continued)

*Primary Examiner* — Anh Tuan T Nguyen
*Assistant Examiner* — Li-Ting Song
(74) *Attorney, Agent, or Firm* — Faegre Drinker Biddle & Reath LLP

(57) ABSTRACT

An endoscope including a coupling member (19) for coupling an insertion tube of the endoscope to an endoscope handle. The coupling member includes a proximal end (21) and a distal end (22) and a passage (20) between an opening in said proximal end (21) and an opening at said distal end (22). The coupling member (19) includes surface features (24) distributed along the circumference and adapted to engage rotation preventing features within an endoscope handle. The coupling member is used in a method for assembling the endoscope.

20 Claims, 8 Drawing Sheets

(58) Field of Classification Search
USPC .................................... 600/136, 137, 139
See application file for complete search history.

(56) References Cited

U.S. PATENT DOCUMENTS

| | | | |
|---|---|---|---|
| 7,862,504 B2 | 1/2011 | Kura et al. | |
| 9,089,263 B2 | 7/2015 | Maruyama | |
| 9,635,999 B2 | 5/2017 | Fujitani et al. | |
| 10,271,914 B2 | 4/2019 | Nambi et al. | |
| 12,016,524 B2* | 6/2024 | Nguyen | A61B 1/00128 |
| 2007/0238926 A1 | 10/2007 | Boulais | |
| 2008/0119695 A1* | 5/2008 | Ueno | A61B 1/0016 600/152 |
| 2008/0275427 A1 | 11/2008 | Sage | |
| 2008/0306469 A1 | 12/2008 | Masuda et al. | |
| 2009/0171158 A1* | 7/2009 | Matsuo | G02B 23/2476 600/139 |
| 2009/0225159 A1 | 9/2009 | Schneider et al. | |
| 2009/0261536 A1* | 10/2009 | Beale | B23B 31/1071 279/19.7 |
| 2010/0249773 A1 | 9/2010 | Clark et al. | |
| 2012/0302835 A1* | 11/2012 | Mathieu | A61B 1/00068 600/136 |
| 2013/0060236 A1 | 3/2013 | Ogle | |
| 2013/0158521 A1 | 6/2013 | Sobue | |
| 2014/0066790 A1* | 3/2014 | Burkett | A61B 5/6851 29/825 |
| 2014/0150782 A1 | 6/2014 | Vazales et al. | |
| 2014/0276326 A1 | 9/2014 | Göllner et al. | |
| 2016/0073857 A1 | 3/2016 | Boutillette et al. | |
| 2016/0113656 A1 | 4/2016 | Privitera et al. | |
| 2017/0010458 A1* | 1/2017 | Nishijima | G02B 23/2476 |
| 2018/0224037 A1* | 8/2018 | Yamagata | F16L 33/01 |
| 2018/0250484 A1 | 9/2018 | Mccormick et al. | |
| 2019/0111238 A1 | 4/2019 | Schultz et al. | |
| 2019/0231179 A1 | 8/2019 | Hansen et al. | |
| 2020/0229684 A1 | 7/2020 | Lund et al. | |
| 2020/0315430 A1 | 10/2020 | Ward-Booth et al. | |
| 2021/0212553 A1* | 7/2021 | Appling | A61B 1/00042 |
| 2023/0301492 A1* | 9/2023 | Kunuki | A61B 1/018 |
| 2024/0115118 A1* | 4/2024 | Ailinger | A61B 1/0057 |

FOREIGN PATENT DOCUMENTS

| | | |
|---|---|---|
| EP | 1747797 A1 | 1/2007 |
| EP | 3266365 A1 | 1/2018 |
| EP | 3316957 A1 | 5/2018 |
| EP | 2874533 B1 | 2/2019 |
| KR | 20190112877 A | 10/2019 |
| WO | 2005089851 A1 | 9/2005 |
| WO | 2011140583 A1 | 11/2011 |

OTHER PUBLICATIONS

Examination report in Danish Patent Application No. PA 2020 70256 dated Jul. 17, 2020, 7 pages.
Written opinion in International Application No. PCT/DK2021/050116, dated Jul. 28, 2021, 9 pages.
Written opinion in International Application No. PCT/DK2021/050115, dated Jul. 26, 2021, 9 pages.
SpyScope DSII Catheter brochure, Boston Scientific, launched 2018.
Office Action in related U.S. Appl. No. 17/920,325 (1108) dated Sep. 5, 2025, 11 pages.

* cited by examiner

ENDOSCOPE AND A METHOD FOR ASSEMBLING AN ENDOSCOPE

CROSS REFERENCE TO RELATED APPLICATIONS

This application is a National Stage entry under 35 U.S.C. § 371 of International Application No. PCT/DK2021/050116, filed Apr. 21, 2021, which claims priority from and the benefit of Danish Patent Application No. PA 2020 70257, filed Apr. 24, 2020; said applications are incorporated by reference herein in their entirety.

TECHNICAL FIELD

The present disclosure relates to a medical device, such as an endoscope, more specifically but not exclusively a duodenoscope, and in particular to the assembly of the endoscope.

RELATED ART

A duodenoscope is a flexible insertion endoscope configured to access a patient's duodenum from the stomach via the patient's mouth and esophagus. When the tip of the insertion tube is positioned in the duodenum there is a need to guide a tool radially from the tip, e.g. towards the biliary ducts in the wall of the duodenum. For that purpose the camera and the exit of a working channel of a duodenoscope is, unlike many other types of endoscopes, not positioned at the end surface of the distal tip of the endoscope. Instead it is arranged at an angle, typically perpendicular to the lengthwise direction of the insertion tube, but still in close proximity to the distal tip of the endoscope. Moreover, in order to accommodate different needs for guiding the tool the exit port of the working channel is provided with a lever that is operated by pulling and pushing a wire connected to an operating member at the endoscope handle. The lever or tool lift is also known as an Albarran mechanism from the original inventor. The Albarran mechanism is essentially a hinged arm arranged in its inactive position as an extension of the wall of the working channel from the exit port on one side thereof. The hinge is in close proximity to the exit port and so arranged that, when activated, the arm or a similar lifting piece may swing in front of the exit port and divert the tool into the field of view of the camera, i.e. also in a direction at an angle, preferably perpendicular, to the longitudinal direction of the insertion tube. An example of such an arrangement is disclosed in U.S. Pat. No. 9,089,263.

As will be understood, a duodenoscope is a specialized or dedicated endoscope, and many features that will be referred to may be applicable to endoscopes in general and not just duodenoscopes. In this description it is to be understood that when reference is made to endoscopes in general it is to be understood as likewise referring to a duodenoscope, i.e. a duodenoscope comprising when features applicable to endoscopes in general.

When the endoscope is inserted into a patient via the mouth, oral cavity, esophagus and the stomach, the insertion tube is advanced via a series of twist and turns and advances. For this the distal end of the insertion tube of the endoscope comprises a bending section comprising a series of articulated segments of which the tip part with the camera and the exit port form the distalmost segment. The bending section is controlled by one or more levers or wheels on the handle of the endoscope, allowing the operator to bend the bending section to a desired curvature in one or more directions. For duodenoscopes there are typically two levers for controlling four directions of bending, i.e. what would normally be referred to as left, right, up and down if the view of the camera were forward from the distal end. When, however, the view of the camera is not forward, e.g. in a duodenoscope the operator does not have this left, right, up, down sense from the camera view and the corresponding motions of the handle necessary in conjunction with the bending, turning and advancing are much less intuitive. It is therefore important that the position of the camera, i.e. the field of view thereof, is well known and precise with respect to the handle.

An endoscope is assembled from many separate parts and subassemblies, including one or more handle parts and an insertion tube. In view of the above it is therefore of importance to keep track of the orientation of the insertion tube with the camera with respect to the handle parts, e.g. housing shells, when assembling the insertion tube including the camera and other parts with the handle housing.

The insertion tube typically comprises a helically wound member preventing the insertion tube from kinking or otherwise collapsing, while still allowing the insertion tube with a flexibility, so as to allow it to adapt to and follow the tortuous insertion passage through the body cavities, e.g. the path mentioned above through mount, oral cavity esophagus, stomach, and duodenum. The helically wound member is normally covered with further layers, such as braids and sealing outer layers. An endoscope with such an insertion tube is disclosed in US2009/0171158.

In US2009/0171158 the proximal end of the insertion tube is terminated within the handle of the endoscope using an arrangement comprising multiple mouth rings and other parts secured to one another by welding, crimping and by means of screws. In a few embodiments the welding is omitted, and instead an externally threaded mouth ring matching the pitch and dimensions of the helically would member is screwed into the helically wound member. This in turn is secured to a second, outer mouth ring by plastic deformation of the latter. The second outer mouth ring is, in turn, secured to one of multiple linkage members within the handle of the endoscope, by means of screws.

Trends in medical endoscopes and in particular duodenoscopes are going towards disposable endoscopes, i.e. endoscopes for single use on one patient only, before they are disposed of. The costs therefore need to be kept down, as compared to traditional re-usable endoscopes that cleaned and sterilized between uses on different patients.

The parts therefore must be low cost and assembly of the parts efficient. The rather complex arrangements of US2009/0171158 do not lend themselves to this. Moreover, US2009/0171158 appears to be a forward looking endoscope and there are no considerations regarding the angular orientation of the insertion tube with respect to the handle.

As for the insertion tube, a desired length is normally cut from a longer length of prefabricated tube comprising e.g. the helically wound member, the braided layer and the outer sealing layer. Cutting such a prefabricated tube in a precise manner, i.e. where the cuts of the helically wound member are located in a well-defined location with respect to the circumference of the insertion tube, i.e. angular location, is difficult.

BRIEF DESCRIPTION OF THE DISCLOSURE

On this background it is the object of the disclosure to provide an endoscope, in particular but not exclusively, a duodenoscope, with a construction using few and low-cost parts, and at the same time the renders itself for easy and efficient assembly.

According to a first aspect of the disclosure this object is achieved by an endoscope comprising a coupling member for coupling an insertion tube of the endoscope to an endoscope handle, said coupling member comprising a proximal end and a distal end, said coupling member further comprising a passage between an opening in said proximal end and an opening at said distal end, said coupling member comprising a circumferential wall surrounding said passage and defining an outer circumferential surface between said proximal end and said distal end, where said outer circumferential surface comprises at least a first sector and a second sector along the length between said proximal end and said distal end, where said first sector is closer to the distal end than said second sector, and where said first sector is provided with a thread adapted to engage the inside of a wound helical member of an insertion tube, characterized in that said second sector comprises surface features distributed along the circumference and adapted to engage rotation preventing features within the endoscope handle.

According to a second aspect of the disclosure the object is achieved by a method for assembling an endoscope, said method comprising, providing a tubular material for the insertion tube, said tubular material comprising a wound helical member, cutting a predetermined length of the tubular material for the insertion tube said tubular, providing a coupling member according to the first aspect of the disclosure, engaging the thread of said first sector with the inside of the wound helical member so as to provide a first sub-assembly, providing a first endoscope handle part and at least one second endoscope handle part, placing the first sub-assembly in said first handle part in a desired rotational orientation with respect to said first handle part, securing the first sub-assembly in said desired rotational orientation with respect to the first handle part using the second handle part.

According to a third aspect of the disclosure the object is achieved by a system comprising an endoscope according to the first aspect of the disclosure and a display unit connectable to said endoscope.

According to a preferred embodiment of the first aspect of the disclosure, the surface features comprise a number of circumferentially arranged protruding teeth. This has been found to ensure sufficiently fine precision in the positioning of the first sub-assembly while at the same time securely ensuring that position when the endoscope is fully assembled.

According to a further preferred embodiment of the first aspect of the disclosure, the first sector comprises an end stop of said thread. This prevents the coupling member from being screwed too far into the would helical member, in turn ensuring that the would helical member does reach a position on the coupling member where it would affect or hinder the assembly of the endoscope.

According to another preferred embodiment, the length of the circumference varies along the length of the coupling member from the proximal end to the distal end. This has several advantages as it may provide generally conical parts of the coupling member inter alia allowing the wound helical member to be expanded for better hold, when the coupling member is screwed into it. Furthermore, the varying circumference or overall diameter, may prevent longitudinal displacement of the first sub-assembly with respect to the handle once secured therein.

According to a further embodiment, the handle comprises at least one handle part provided with internal surface features adapted to engage the surface features distributed along the circumference of the coupling member. Thereby a good securing of the insertion tube to the handle against rotation is secured in the assembled state of the endoscope, while still allowing correct angular positioning during the assembly of the endoscope.

According to another preferred embodiment, the endoscope comprises an insertion tube with a wound helical member which is engaged by the thread of the coupling member. This allows for a simple assembly procedure.

According to yet another preferred embodiment, the engagement between the thread of the coupling member and the wound helical member is secured by glue. Thereby a stable and durable connection is achieved in the assembled endoscope.

An endoscope yet a further preferred embodiment, the handle comprises a first handle part, a second handle part and third hand third handle part, and wherein the third handle part comprises an annular member arranged around said first and second handle parts. Using such an annular member to secure and hold the handle parts together in the assembled endoscope has shown to be a very simple and efficient way to hold the handle parts together, while also being easily done during the assembly of the endoscope.

According to a preferred embodiment of the second aspect of the disclosure, the first sub-assembly comprises a camera and said camera is used to verify said desired rotational orientation before the first sub-assembly is secured with respect to the first handle part. This is advantageous as the correct alignment of not only the camera but also the tool lifting lever is important for the operator using the endoscope, and the camera being the most expensive single component the proper functioning thereof can at the same time be checked.

According to another preferred embodiment of the second aspect of the disclosure the method further comprises the steps of providing a third handle part and securing the first handle part and the second handle part with respect to each other using said third handle part. This has been found to provide a simple and efficient means for holding the two main handle parts securely together against the forces provided within the handle by the first sub-assembly. Preferably, the third handle part comprises an annular member that may easily be slit over the two main handle parts during assembly of the endoscope.

BRIEF DESCRIPTION OF THE FIGURES

The disclosure will now be made in greater detail based on non-limiting exemplary embodiments and the drawings on which.

DETAILED DESCRIPTION

Figure 1:
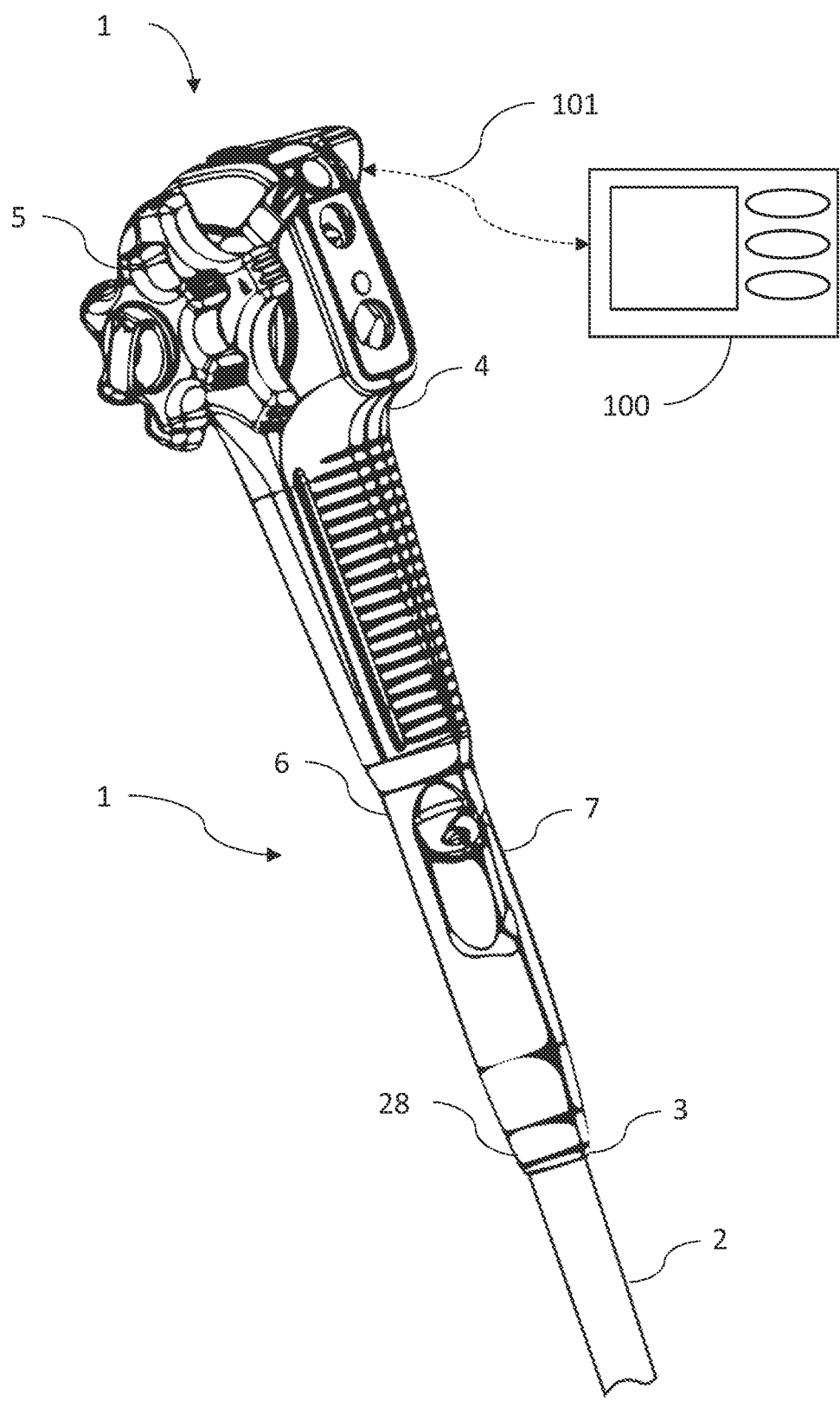
FIG. 1 shows a system comprising a display unit and a medical device exemplified as an endoscope according to the disclosure.

Turning first to FIG. 1, a system comprising a medical device, such as an endoscope 1, more specifically a duodenoscope, and a display unit 100. is shown. The endoscope 1 is connectable to the display unit via a cable 101 or a wireless connection. The endoscope 1 comprises an insertion tube 2 extending from the distal end 3 of the handle 4. At or close to the proximal end of the handle operating members such as rotary knobs 5 are located.

Figure 2:
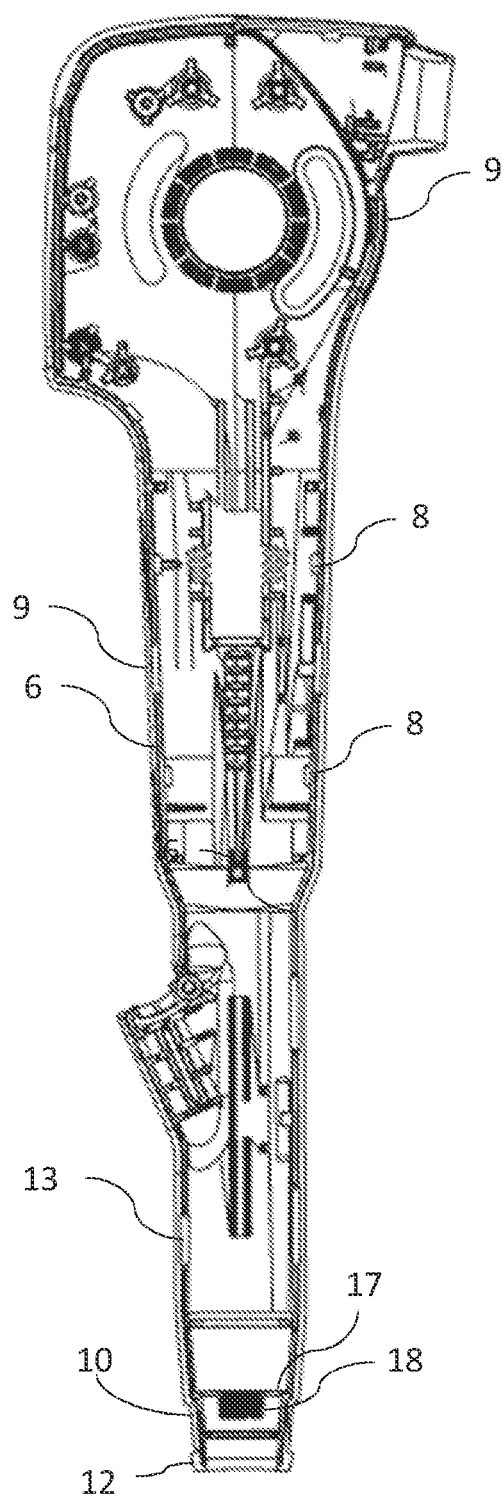
FIG. 2 shows a first handle housing part for the endoscope.
Figure 3:
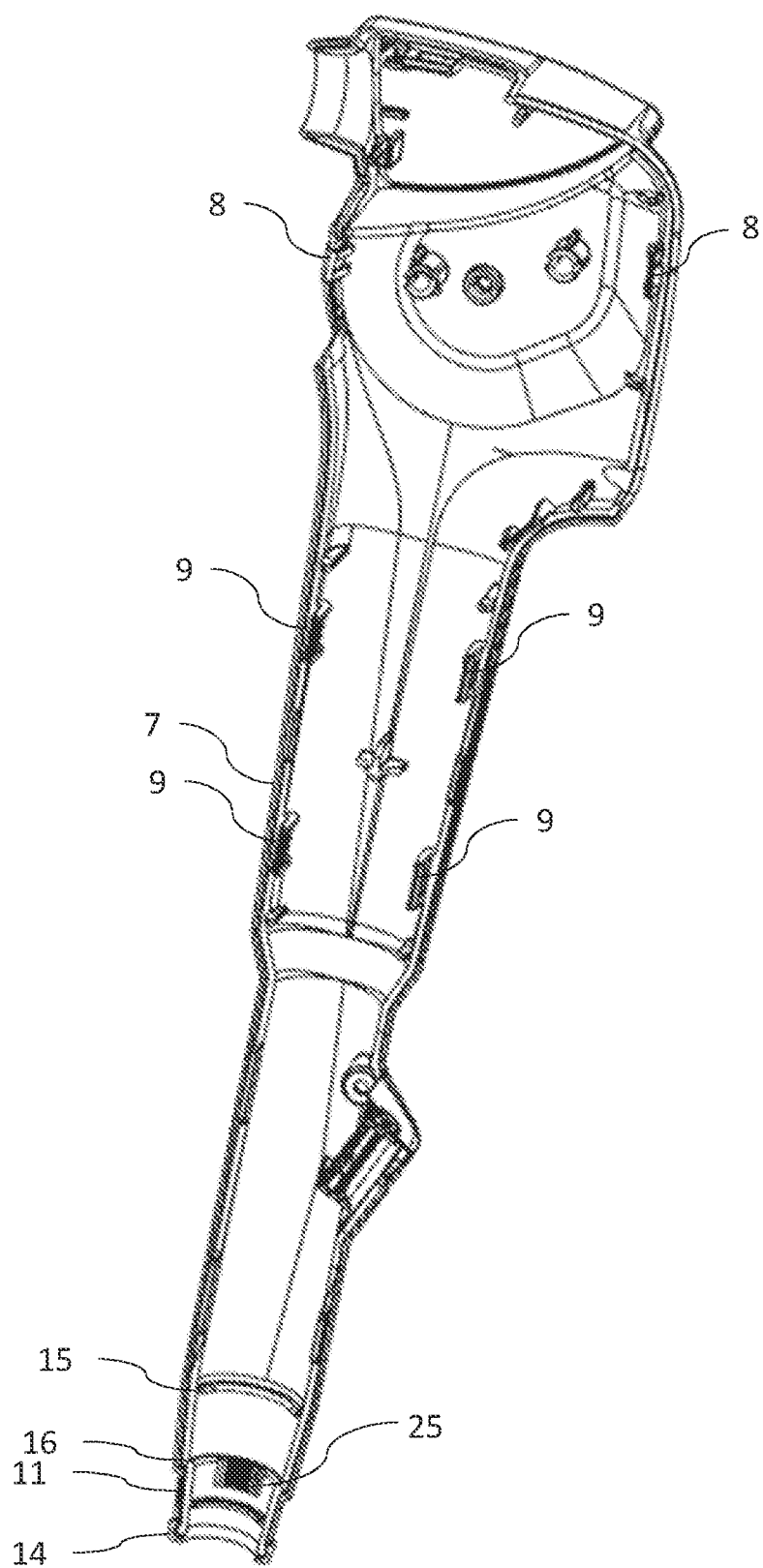
FIG. 3 shows a second handle housing part for the endoscope.

As can be seen from FIGS. 2 and 3, the handle comprises two matching shell-shaped parts, i.e. a first handle housing part 6 and a second handle housing part 7 which when joined form exterior of the handle protecting the internal parts (not shown). For the joining and mutually securing of the first and second handle parts, they may comprise mutually engaging locking members such as barbs 8 and lugs 9 adapted to interlock the two housing parts, so as to form the majority of the handle housing. Each of the shell-shaped first and second handle housing parts 6, 7 comprise an interior surface and an exterior surface, as defined by the assembled handle.

Figure 4:
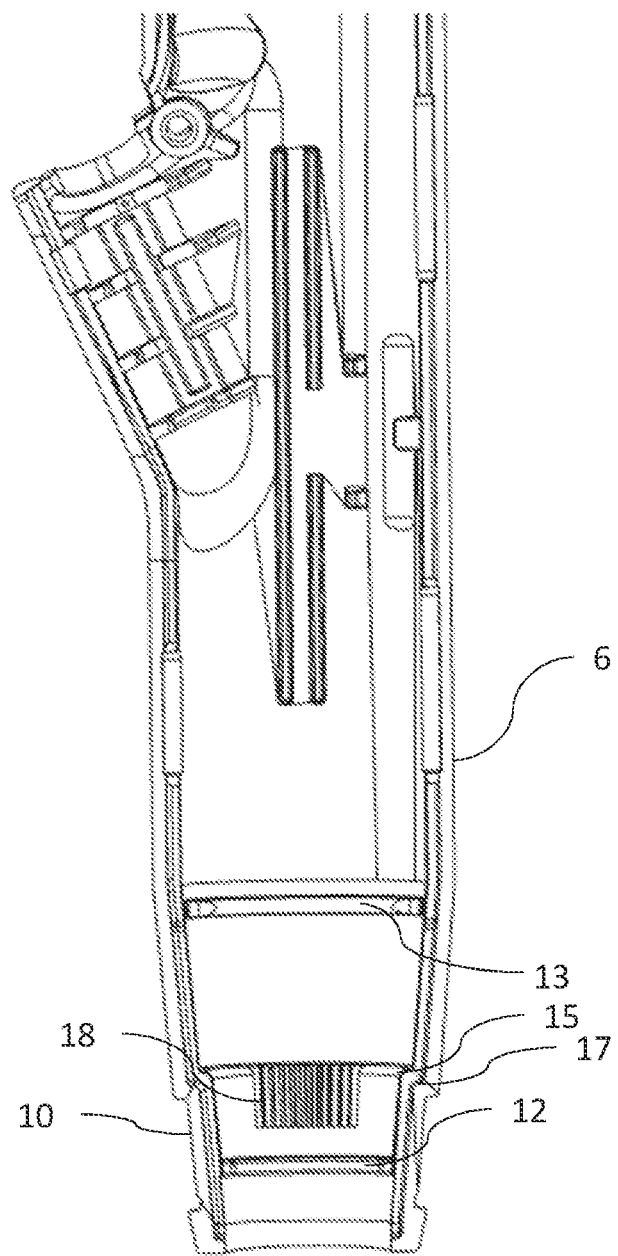
FIG. 4 shows a detail of the distal end of the handle housing part of FIG. 2.

In FIG. 4 the distal end of the first handle housing part 6 is shown in greater detail. As can be seen the first handle housing part 6 has a taper towards the distal end of the handle. In the external surface of the tapered part a recess 10 is provided, which, together with a corresponding recess 11 in the external surface of the second handle housing part 7, form a circumferential groove or recess when the first handle housing part 6 and the second handle housing part 7 are joined. On the interior surface of the first handle housing part 6 a first semicircular rib 12 and a second semicircular rib 13 are formed. Between the first and second semicircular ribs 12, 13 a shoulder 17 or ledge is provided. Adjacent the shoulder 17 a number of teeth 18 protruding from the interior wall of the first handle housing part 6 are provided.

Likewise, as can be seen in FIG. 3, on the interior surface of the second handle housing part 7 a third semicircular rib 14 and a fourth semicircular rib 15 are formed. Between the third and fourth semicircular ribs 14, 15 a shoulder 16 or ledge is provided. Adjacent the shoulder 16 a number of teeth 25 protruding from the interior wall of the second handle housing part 7 are provided.

Figure 5:
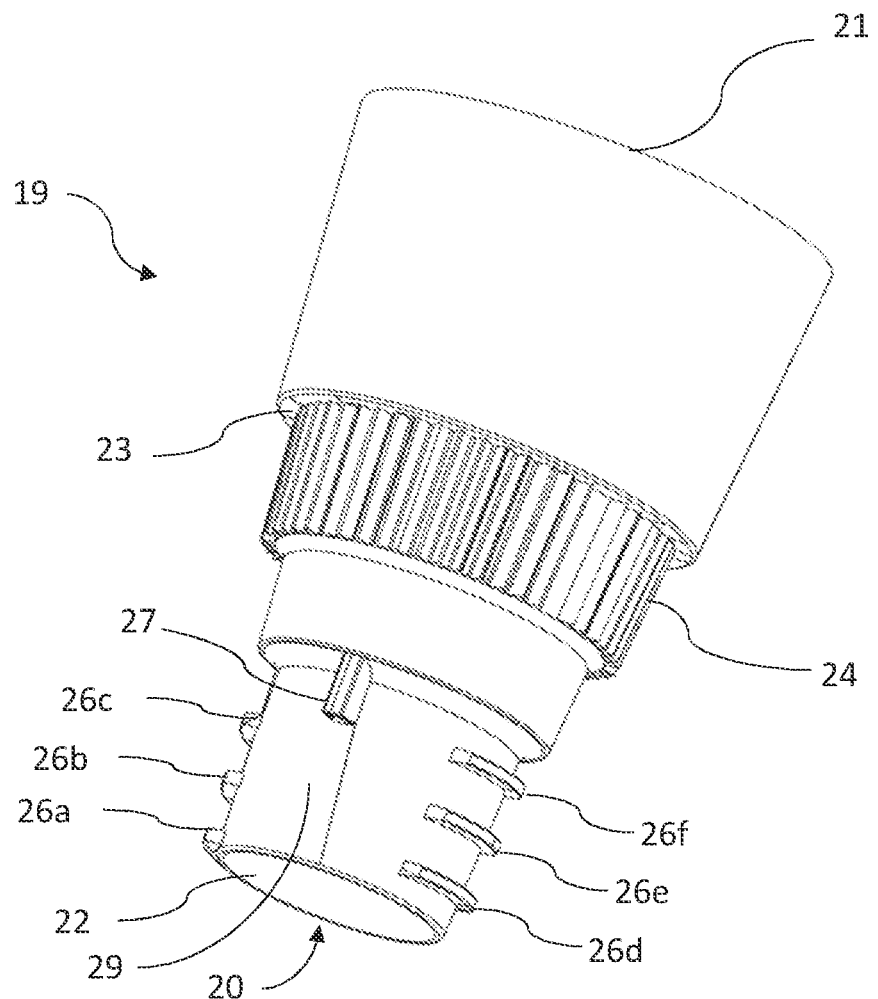
FIG. 5 shows a coupling member according to the invention

The first and second semicircular ribs 12, 13 together with the interior wall of the first handle housing part 6 form part of a receptacle for a coupling member 19 shown in FIG. 5.

The coupling member 19 provides a simple and cost-efficient way of assembling the insertion tube 2 with the handle 4 of the endoscope 1.

Figure 6:
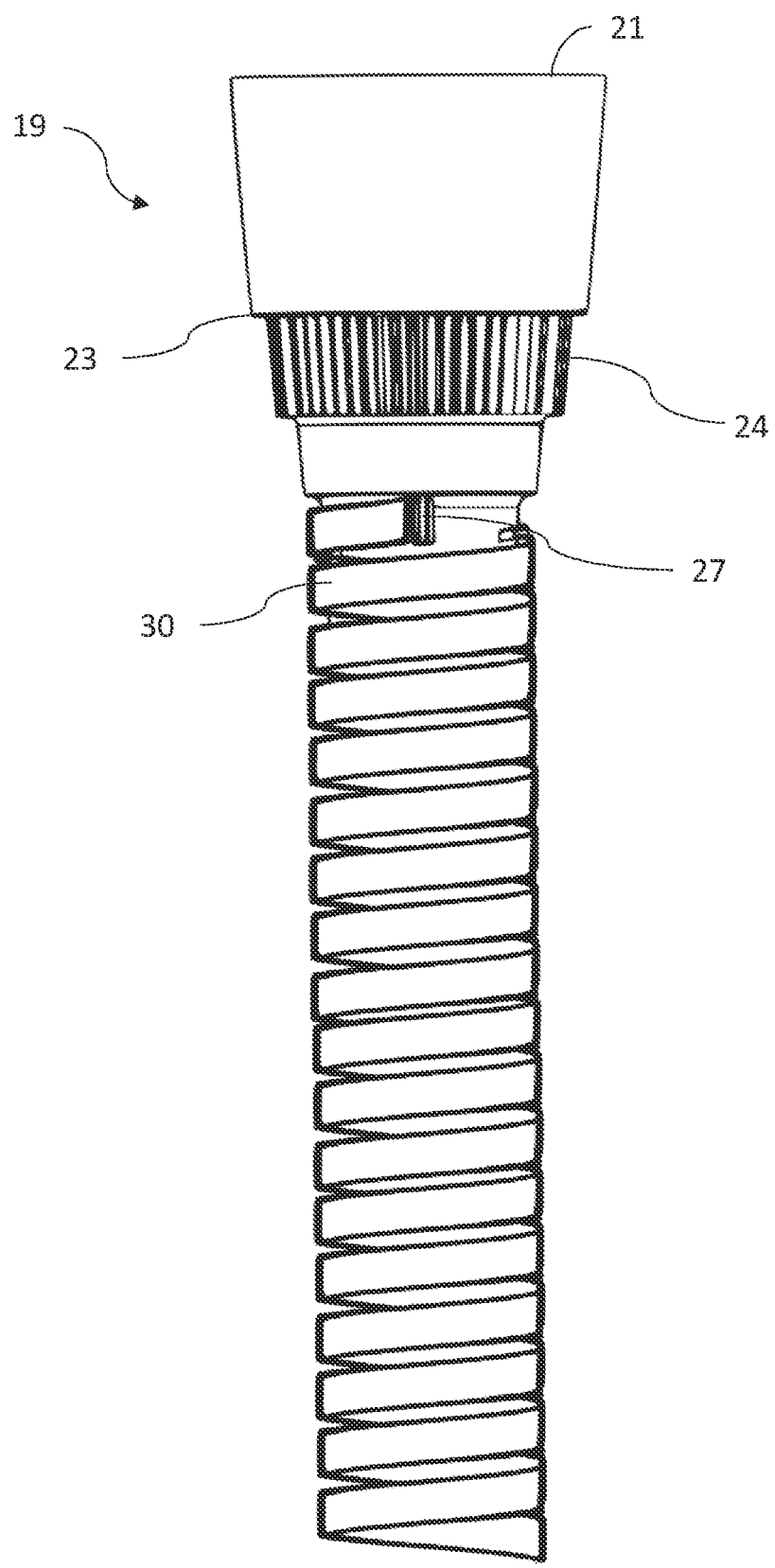
FIG. 6 shows how the coupling member engages a wound helical member of the insertion tube.
Figure 7:
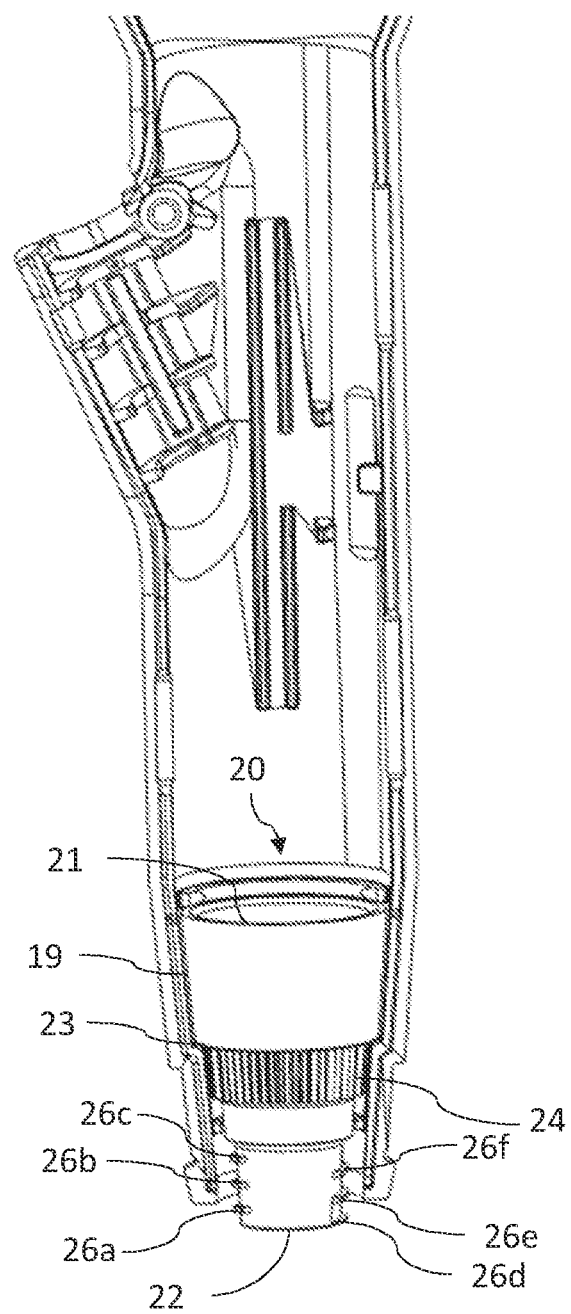
FIG. 7 shows an elevated view of the coupling member placed in position in the first handle housing part.
Figure 8:
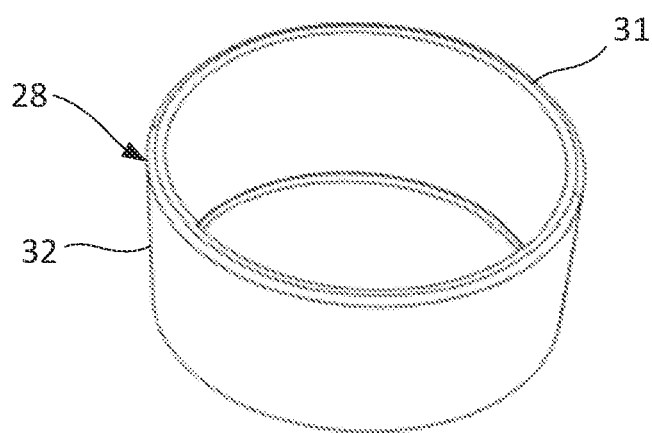
FIG. 8 shows a third handle housing member for securing the first and second handle housing parts and the coupling member.
Figure 9:
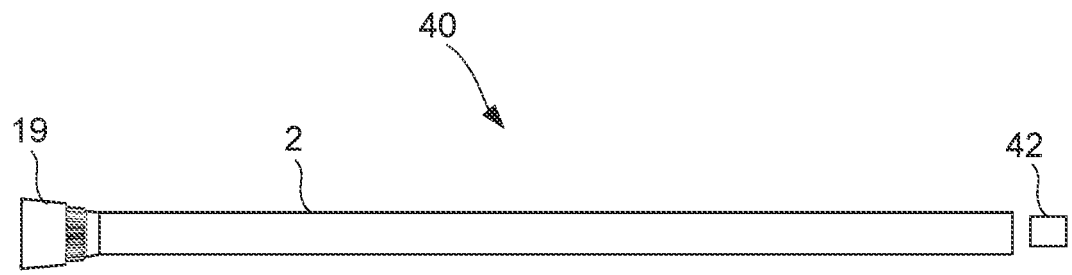
FIG. 9 shows an sub-assembly including the coupling member of FIG. 7 and the insertion tube of FIG. 6.

The coupling member 19 comprises a generally tubular member with a through passage 20 from the proximal end 21 towards the distal end 22. The circumference at the proximal end 21 is larger than at the distal end 22 so that the coupling member generally has a taper towards the distal end 22. As can be seen, the taper is not smooth but comprises at least one shoulder 23 adapted to match the shoulder 17 in the first handle housing part 6. Also, the coupling member comprises a number of teeth 24 arranged circumferentially around a mid-section of the coupling member 19 (a second sector of the coupling member 19) adjacent the shoulder 23. The teeth 24 are so located and distributed that at least some of them will engage between the teeth 18 in the first handle housing part 6 or a corresponding set of teeth 25 on the second handle housing part 7. Towards the distal end 22 the coupling member 19 comprises a cylindrical or preferably frusto-conical part (a first sector of the coupling member 19) 29 which is provided with an external thread 26a-26f adapted to engage between the windings of a wound helical member forming part of the wall of the insertion tube 2. Using the external thread 26a-26f the coupling member 19 may be screwed into the proximal end of the wall of the insertion tube 2 to form a sub-assembly 40 including the insertion tube 2 and a camera 42, as seen in FIG. 9. The part 29 is preferably frusto-conical in order to expand the wound helical member 30 slightly, when it is screwed into the latter, as mentioned above and shown in FIG. 6, so as increase the force between the coupling member 19 and the insertion tube 2 holding them together. The external thread 26a-26f may be continuous or, as shown, segmented. Glue may be added to ensure that the insertion tube 2 remains in position on the coupling member 19. Preferably the thread 26a-26f is therefore segmented, so as to allow glue to be located in the gaps between the segments and form a glue bond between the coupling member 19 and the insertion tube so as to hold them even better together. Optionally, the coupling member 19 may comprise and end stop 27 preventing it from being screwed too far into the insertion tube 2.

The sub-assembly may then be placed in the receptacle where shoulder 23 and the surface of the proximal end will engage the shoulder 17 and semicircular rib 13 and secure the sub-assembly in the longitudinal direction with respect to the handle 4. The rotational orientation of the sub-assembly with respect to the first handle housing part 6 may then be checked and adjusted. This is preferably done using the camera 42 in the distal end of the sub-assembly. If adjustment is not correct, the sub-assembly may be turned so that the engagement between the teeth 18 in the first handle housing part and the teeth 24 on the coupling member 19 changes. When eventually the correct rotational position is reached, the final position of the sub-assembly may be secured by attaching the second handle housing part 7 to the first handle housing part 6 whereby the teeth 25 of the second handle housing part 7 also engage and secure the teeth 24 of the coupling member 19.

Using the camera for the verification of the rotational position is advantageous in the sense the camera, being the single most costly part of the endoscope 1, needs to be checked one or more times during the assembly process anyway in order to replace it if defective, rather than rejecting the final endoscope 1.

Evidently, the use of engaging teeth 18, 24 and 25 is not the only way to secure against rotation, in principle any kind of interlocking geometries may be used. Using engaging teeth 18, 24 and 25, however allows for sufficiently small discrete angular steps to achieve sufficient precision. Similarly, the preferably semicircular ribs 12-15 need not be semicircular. In principle any protrusion or other discontinuity on the interior surface of the handle housing parts 6, 7 that will prevent longitudinal displacement of the coupling member 19, and hence the subassembly will suffice. However, semicircular ribs 12-15 forming together essentially two full circular ribs will provide maximum strength and hold for a given thickness of the ribs 12-15. The given thickness of the ribs 12-15 on the other hand is largely determined by thickness of the walls of the respective handle housing part 6, 7 because of the aim to keep material thicknesses equal throughout the moulded items to facilitate the moulding process. That is to say, the widths of the ribs 12-15 essentially correspond to the wall thickness of the first and second handle housing parts 6, 7.

With the subassembly in place in the correct orientation with respect to the first shell-shaped handle housing part 6, the subassembly is secured by the joining of the first and second handle housing parts 6, 7. In doing so the mutual locking means 8, 9 engage and interlock the first and second shell-shaped handle housing parts 6, 7. Other mutual locking means than those exemplified are of course known to the skilled person. However, since the insertion tube 2 forming part of the subassembly extends a substantial distance from the distal end of the handle 4 there will in use be substantial forces acting upon the coupling member 19. The forces will transmit through the coupling member 19 and essentially try to pry the first and second handle housing parts 6, 7 apart. The two handle housing parts 6, 7 are therefore secured against each other not only by means of interlocking members 8, 9 but further by a third handle housing part in the form of a hoop 28 arranged externally on the first and second handle housing parts 6, 7, and serving as a locking ring. The hoop 28 is essentially an annular member with a frusto-conical shape, preferably both on the inner surface 31 and on the outer surface 32. The hoop 28 is made from a material with sufficient tensile strength to withstand the forces transmitted from the coupling member 19 via the handle housing parts 6, 7. However, the hoop 28 has some elasticity as do the handle housing parts 6, 7 thereby allowing the hoop 28 to be slit over the insertion tube and the tapered distal end part of the handle 4 into the circumferential groove formed by the recesses 10, 11. The recesses 10, 11 are adapted to match the varying inner circumference of the hoop 28, i.e. also have a taper, and the width of the recesses match the height of the hoop 28 to leave as small gaps as possible between the hoop 28 and the handle 4. The bottom of the groove or complete recess comprising the recesses 10 and 11 preferably comprises a frusto-conical surface, but it is of course not excluded that it may be slightly convex or concave, in which case the inner surface 31 of the hoop 31 would preferably have a matching shape. Similarly, the outer surface 32 of the hoop 28 is adapted to match the taper of the distal end of the handle 4, so as to provide as smooth an outer surface of the handle 4 as possible.

The location of the recesses 10, 11 preferably register with the coupling member 19, more specifically with the cylindrical or preferably frusto-conical part 29 which is provided with the external thread 26a-26f of the coupling member 19. This is the narrowest part of the coupling member 19 and allows one side of the recesses 10, 11, respectively to be provided in conjunction with the shoulder 17, in turn keeping the wall thickness of the handle housing parts 6, 7 more or less constant for the above-mentioned moulding reasons.

What is claimed is:
1. An endoscope comprising:
   a handle comprising a handle part extending from a proximal end to a distal end of the handle, the handle part comprising a single-piece part including rotation preventing features protruding inwardly;
   an insertion tube comprising a wound helical member and a proximal end;
   a coupling member coupling the insertion tube to the handle, the coupling member comprising a single-piece part including:
   a proximal end having an opening and a distal end having an opening;
   a passage between the opening in the proximal end and the opening in the distal end;
   a circumferential wall surrounding the passage and defining an outer circumferential surface between the proximal end and the distal end, the outer circumferential surface comprising a first sector and a second sector,
   the first sector being closer to the distal end than the second sector, a portion of the first sector positioned inside the proximal end of the insertion tube and having a thread engaging an inside of the wound helical member of the insertion tube, and
   the second sector comprising surface features extending radially outwardly, the surface features engaging the rotation preventing features of the handle part,
   wherein the proximal end of the insertion tube is positioned between the first sector and the handle part.

2. The endoscope of claim 1, wherein the surface features comprise a number of circumferentially arranged protruding teeth.

3. The endoscope of claim 1, wherein the first sector comprises an end stop of said thread.

4. The endoscope of claim 3, wherein the end stop comprises a protrusion extending from the first sector and having a lateral surface extending along a longitudinal direction of the first sector, the lateral surface being configured to abut a proximal end of the wound helical member of the insertion tube.

5. The endoscope of claim 1, further comprising the handle, the handle comprising the handle part having an internal surface including the rotation preventing features, the rotation preventing features being configured to engage the surface features of the second sector of the coupling member.

6. The endoscope of claim 5, further comprising the insertion tube, wherein the wound helical member of the insertion tube is engaged by the thread of the coupling member to secure the insertion tube to the handle.

7. The endoscope of claim 6, the coupling member further comprising an end stop formed by a protrusion extending from the first sector, the end stop abutting a proximal end of the wound helical member of the insertion tube.

8. The endoscope of claim 6, wherein glue secures the thread of the coupling member and the wound helical member.

9. The endoscope of claim 5, wherein the coupling member includes a coupling member shoulder adjacent and proximal of the second sector, wherein the internal surface includes a first shoulder adjacent and proximal of the surface features of the internal surface, and wherein the first shoulder engages the coupling member shoulder to prevent longitudinal movement of the coupling member in the housing in at least one direction.

10. The endoscope of claim 1, wherein a length of a circumference of the coupling member varies along a length of the coupling member from the proximal end to the distal end thereof.

11. The endoscope of claim 1, wherein the first sector comprises a circumferential surface, wherein the thread extends outwardly from the circumferential surface, and wherein the circumferential surface of the first sector is tapered toward the distal end.

12. A method for assembling an endoscope, said method comprising,
   providing the coupling member according to claim 1;
   providing the wound helical member;
   engaging the thread of the first sector with the inside of the wound helical member so as to provide a first sub-assembly, providing a first handle part and at least one second handle part;

placing the first sub-assembly in the first handle part in a desired rotational orientation; and coupling the second handle part to the first handle part to secure the first sub-assembly in the desired rotational orientation.

13. The method of claim 12, wherein the first sub-assembly comprises a camera, the method further comprising: using the camera to verify that the first sub-assembly is in the desired rotational orientation before coupling the second handle part to the first handle part.

14. The method of claim 12, further comprising: providing a third handle part and securing the first handle part and the second handle part with respect to each other using the third handle part.

15. A visualization system comprising:
the endoscope according to claim 1; and
a display unit connectable to the endoscope.

16. The visualization system of claim 15, wherein the endoscope includes an image sensor operable to generate video signals, wherein the display unit includes a display screen, and wherein the display unit is configured to present with the display screen video images corresponding to the video signals.

17. An endoscope comprising:
a coupling member for coupling an insertion tube of the endoscope to a handle of the endoscope, the coupling member comprising:
a proximal end having an opening and a distal end having an opening;
a passage between the opening in the proximal end and the opening in the distal end;
a circumferential wall surrounding the passage and defining an outer circumferential surface between the proximal end and the distal end, the outer circumferential surface comprising a first sector and a second sector,
the first sector being closer to the distal end than the second sector and having a thread adapted to engage an inside of a wound helical member of the insertion tube, and
the second sector comprising a circumference and surface features distributed along the circumference, the surface features configured to engage rotation preventing features within the endoscope handle,
wherein the first sector tapers toward the distal end of the coupling member.

18. An endoscope comprising:
a handle; and
a coupling member for coupling an insertion tube of the endoscope to the handle of the endoscope, the coupling member comprising:
a proximal end having an opening and a distal end having an opening;
a passage between the opening in the proximal end and the opening in the distal end;
a circumferential wall surrounding the passage and defining an outer circumferential surface between the proximal end and the distal end, the outer circumferential surface comprising a first sector and a second sector,
the first sector being closer to the distal end than the second sector and having a thread adapted to engage an inside of a wound helical member of the insertion tube, and
the second sector comprising a circumference and surface features distributed along the circumference, the surface features configured to engage rotation preventing features within the endoscope handle,
wherein the handle comprises a first handle part, a second handle part and a third handle part, and
wherein the third handle part comprises an annular member arranged around the first handle part and the second handle part.

19. The endoscope of claim 18, wherein the first handle part comprises a first outer surface having a first recess, wherein the second handle part comprises a second outer surface having a second recess, wherein the first recess and the second recess form a circumferential recess; and wherein the annular member is positioned in the recess to hold together the first handle part and the second handle part.

20. A method for assembling an endoscope, said method comprising:
providing the coupling member comprising:
a proximal end having an opening and a distal end having an opening;
a passage between the opening in the proximal end and the opening in the distal end;
a circumferential wall surrounding the passage and defining an outer circumferential surface between the proximal end and the distal end, the outer circumferential surface comprising a first sector and a second sector,
the first sector being closer to the distal end than the second sector and having a thread adapted to engage an inside of a wound helical member of the insertion tube, and
the second sector comprising a circumference and surface features distributed along the circumference, the surface features configured to engage rotation preventing features within the endoscope handle;
providing the wound helical member;
engaging the thread of the first sector with the inside of the wound helical member so as to provide a first sub-assembly,
providing a first handle part and at least one second handle part;
placing the first sub-assembly in the first handle part in a desired rotational orientation; and
coupling the second handle part to the first handle part to secure the first sub-assembly in the desired rotational orientation;
providing a third handle part; and
securing the first handle part and the second handle part with respect to each other using the third handle part, wherein the third handle part comprises an annular member.

* * * * *